United States Patent Office

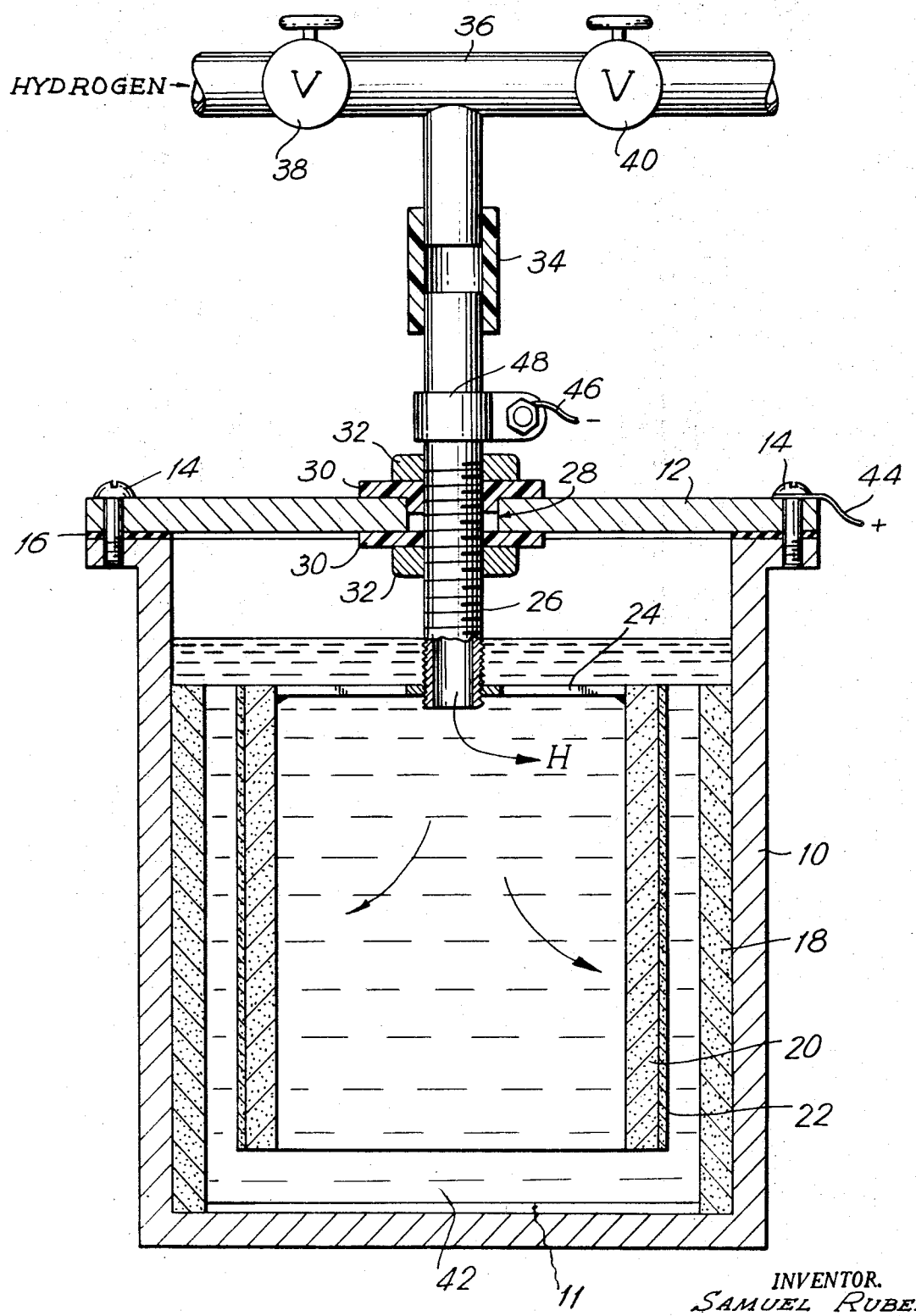

3,544,375
Patented Dec. 1, 1970

---

3,544,375
RECHARGEABLE FUEL CELL
Samuel Ruben, 52 Seacord Road,
New Rochelle, N.Y. 10804
Filed May 22, 1967, Ser. No. 640,300
Int. Cl. H01m 13/02, 27/04
U.S. Cl. 136—86     4 Claims

---

ABSTRACT OF THE DISCLOSURE

A rechargeable fuel cell utilizing an oxidizable and ionizable gas, such as hydrogen, methane or hydrazine as its anodic agent and a rechargeable or electrochemically reoxidizable metal oxide as its cathode. On discharging, oxidizable gas is supplied to the porous anode, and preferably by assistance of a catalyst, is combined with oxygen derived from the cathode, producing water. On charging, the said water is decomposed to hydrogen and oxygen of which the oxygen component serves to reoxidize the cathode. As the net water content is balanced between discharge and charge cycle, the cell of the invention can be continuously operated without the necessity of replacing its electrolyte.

---

BACKGROUND OF THE INVENTION

This invention relates to fuel cells, and, more particuarly, to one in which hydrogen, methane, hydrazine, or other oxidizable and ionizable gas or vapor is utilized at the anode and an electrochemically reducible metal oxide at the cathode.

The object of the invention is to provide a rechargeable fuel cell having the following characteristics:

(1) It is capable of being continuously operated without the necessity of replacing its electrolyte.

(2) On recharging, the absorbed water end product is electrolyzed out of the electrolyte and its oxygen component is utilized to reoxidize the cathode reactant or depolarizer.

(3) It produces maximum energy in a small volume.

(4) It is operable over a wide range of ambient temperatures, and (5) It provides maximum potential in a fuel type cell.

SUMMARY

Broadly stated, according to the principles of the invention, there is provided an anode element in the form of a porous sintered nickel cylinder or tube that has been coated on its outer surface with a suitable catalyst, such as platinum black, capable of catalytically dissociating $H_2$ into $H^+$. In its preferred form, the cathode is a sintered porous nickel tube which has been electrolytically impregnated with nickel hydroxide. After impregnation, the nickel hydroxide is brought by an anodic treatment to the most active oxide state where it will oxidize to water the hydrogen ions produced at the anode. While a porous nickel electrode impregnated with nickel hydroxide is the preferred cathode element, other metal oxides may be used as cathodes or depolarizers such as a cylinder composed of mercuric oxide having admixed therewith an inert electronic conductor, such as graphite or silver, silver oxide, copper oxide and manganese oxide. The electrolyte may be an aqueous solution of an alkali metal hydroxide such as, preferably, a 35% solution of potassium hydroxide. Other suitable alkaline solutions are sodium hydroxide or lithium hydroxide, or mixtures of the above-mentioned hydroxides.

BRIEF DESCRIPTION OF THE DRAWING

In order that those skilled in the art may have a better understanding of the invention, reference is made to the single figure of the drawing which is a vertical sectional view of a cell embodying the invention.

DESCRIPTION OF THE PREFERRED EMBODIMENT

Referring now to the drawing, reference numeral 10 denotes a steel container having a steel cover 12 secured thereto by means of screws 14. A gasket 16 of a suitable elastomer is compressed between cooperating portions of the container and its cover thereby to seal the cell. Cathode 18 is in the form of a hollow porous cylinder of sintered nickel powder which is force-fitted to the inner walls of container 10. This cylinder is made the cathode in a molten electrolyte of nickel nitrate, $Ni(NO_3)_2 \cdot 6H_2O$, at about 80° C. whereby it is impregnated with nickel hydroxide by cathodic electrodeposition. The time of this treatment and the current density are dependent upon various factors, such as the porosity, weight and volume. Thus, for a cathode cylinder 0.1 inch in thickness, a current density in the order of 100 milliamperes per square inch applied for 2 hours provides satisfactory results. These values are given only by way of example and should be determined with respect to a specific cathode dimension. After deposition of the nickel hydroxide, it is washed free of any residual or absorbed nitrate and is then oxidized to the maxivalent oxide state by anodizing in an alkaline electrolyte. The use of a solid oxide cathode in accordance with the principles of the present invention allows obtaining considerably higher current densities and higher voltages then would be possible by oxidizing with air or gaseous oxygen as in conventional fuel cells.

Reference numeral 20 denotes the anode in the form of a hollow porous sintered nickel cylinder which is coated on its outer surface with a layer 22 of a catalytic agent, such as platinum or palladium, or, for minimum hydrogen overvoltage, platinum black. Anode element 20 is supported by a bracket or spider 24 into a center opening of which is threaded the lower end of hydrogen inlet tube 26. The said tube extends through opening 28 in top or cover plate 12 and is insulatedly secured therein by insulative bushings 30 and nuts 32. The upper end of tube 26 is threaded into the lower end of a sleeve 34 of an insulating material, into the upper end of which is threaded the vertically depending end of a T-shaped conduit 36. Inlet valve 38 and exhaust valve 40 are respectively arranged in the two horizontal branches of conduit 36, the object of which will appear presently. A body of electrolyte 42 is filling out container 10 to such a level as to have anode 20 and cathode 18 fully submerged. While in the foregoing porous pressed and sintered nickel powder bodies have been disclosed for the electrode elements, excellent results can be obtained by using porous pressed and sintered titanium powder bodies, preferably carbided at least on the exposed surfaces thereof, as this is disclosed and claimed in my co-pending application Ser. No. 609,781, filed Jan. 17, 1967. The positive terminal of the cell is provided by a lug 44 under screw 14 and the negative terminal by a similar lug 46 bolted to a strap 48 around tube 26.

OPERATION

From the foregoing description, the operation of the cell of the invention will be readily understood by those skilled in the art.

On discharge, hydrogen is fed into anode 20 through open inlet valve 38 and conduits 36 and 26, exhaust valve 40 being closed. The hydrogen displaces any electrolyte present in the anode and becomes dissociated by platinum catalyst 22 to the monatomic form, $H^+$. This monatomic hydrogen discharges under the electrical field produced by the electrodes to the nickel oxide cathode 18, where it combined with its available oxygen component to form water. A potential of about 1.24 volts is produced, dependent upon the reactant metal and its state of oxidation.

When the cathode is completely reacted, the cell is recharged by connecting the cathode as the anode in a direct current charging circuit whereby the oxygen produced at its surface recombines to reoxidize the depolarizer. The reoxidation or charging of the cathode is so controlled by disconnecting at polarization conditions that no free oxygen gas is produced. During charging, hydrogen inlet valve 38 is closed and exhaust valve 40 is opened. Thus, the hydrogen generated is allowed to escape through the exhaust valve, or can be stored with proper equipment, if desired, whereas the other component, oxygen, is combined with the cathode to reoxidize its negative reactant.

While hydrogen is the preferred anodic reactant, other oxidizable gases can be used with equal or similar results, such as methane, or hydrazine.

Although the present invention has been disclosed in connection with preferred embodiments thereof, variations and modifications may be resorted to by those skilled in the art without departing from the principles of the present invention. Thus, it is preferred to provide a coating 11 of a suitable insulating material, such as a suitable synthetic resin, on the bottom of container 10 in order to prevent its contact with the electrolyte. All of these variations and modifications are considered to be within the true spirit and scope of the invention, as disclosed in the foregoing description and defined by the appended claims.

What is claimed is:

1. A rechargeable fuel cell comprising a sealed casing, a cylindrical porous cathode support of pressed and sintered nickel powder lining the inner surface of said casing, an oxide of nickel impregnated in the pores of said support, a cylindrical porous anode of pressed and sintered nickel powder spacedly and concentrically mounted within said cathode support, a catalytic layer on the outer surface of said anode, an alkaline electrolyte in said casing in which said cathode and said anode are submerged, and means for supplying hydrogen under pressure to said cell.

2. A rechargeable fuel cell as claimed in claim 1 in which the hydrogen supplying means includes means effective during discharging the cell and are disabled during charging the cell.

3. A rechargeable fuel cell as claimed in claim 2 in which exhaust means are provided through which hydrogen produced during charging the cell may escape.

4. A rechargeable fuel cell comprising a porous cathode support made of a material selected from the group consisting of nickel and titanium carbided at least on its outer surface, electrochemically active cathode material arranged in the pores of said support, an anode having a catalytic surface, an electrolyte in contact with said cathode and said anode, and means for supplying hydrogen to said anode during discharging the cell.

References Cited

UNITED STATES PATENTS

| 396,342 | 1/1889 | Scheithauer | 136—86 |
| 2,716,670 | 8/1955 | Bacon | 136—86 |
| 3,042,551 | 7/1962 | Perry | 136—86 X |
| 3,218,195 | 11/1965 | Corren | 136—86 |
| 3,300,343 | 1/1967 | Huber et al. | 136—86 |
| 3,300,344 | 1/1967 | Brag et al. | 136—86 |
| 3,317,349 | 5/1967 | Elliott et al. | 136—86 |
| 3,380,856 | 4/1968 | Pohl | 136—120 FC |
| 3,391,028 | 7/1968 | Vose | 136—86 |

FOREIGN PATENTS 900,451   7/1962   Great Britain.

ALLEN B. CURTIS, Primary Examiner

U.S. Cl. X.R.

136—121